United States Patent [19]

Gregory

[11] 4,153,942
[45] May 8, 1979

[54] INDUSTRIAL CONTROL PROCESSOR
[75] Inventor: Vernon C. Gregory, Tempe, Ariz.
[73] Assignee: Motorola, Inc., Schaumburg, Ill.
[21] Appl. No.: 761,738
[22] Filed: Jan. 24, 1977
[51] Int. Cl.² ............................................. G06F 3/00
[52] U.S. Cl. ................................................... 364/900
[58] Field of Search ... 364/200 MS File, 900 MS File

[56] References Cited
U.S. PATENT DOCUMENTS

| 3,293,611 | 12/1966 | Goldfeld et al. | 364/900 |
| 3,753,243 | 8/1973 | Ricketts Jr. et al. | 364/200 |
| 3,909,789 | 9/1975 | Holtey et al. | 364/200 |
| 4,001,789 | 1/1977 | Sweet | 364/200 |

Primary Examiner—Harvey E. Springborn
Attorney, Agent, or Firm—Joe E. Barbee

[57] ABSTRACT

A one bit industrial control unit for executing a program of non-arithmetic instructions includes a one-bit bidirectional data conductor, a 4-bit instruction register and instruction decoder, and control logic coupled to the instruction decoder for generating control signals to effect execution of the non-arithmetic instructions. A logic unit having a first input coupled to the bidirectional data conductor, a second input, and an output is capable of performing logical AND, AND-complement, OR, OR-complement, and Exclusive NOR functions upon logical signals applied to its two inputs. A result register is coupled to the output of the logic unit. The output of the result register is fed back to the second input of the logic unit and is coupled by way of a write gate to the first input of the logic unit. An output enable instruction may be decoded by the instruction decoder to load and to enable an output latch, which in combination with gating circuitry activated by a store or a store-complement instruction, generates a write signal. An input enable instruction can be decoded to provide an input to an input enable to latch to control loading data from the bidirectional data conductor. The output of the input enable latch serves to provide a conditional inhibit to coupling of data from the bidirectional data conductor to the first input of the logic unit.

12 Claims, 12 Drawing Figures

INDUSTRIAL CONTROL PROCESSOR

BACKGROUND OF THE INVENTION

1. Field of the Invention

The present invention relates, in general, to digital data processing devices, and more particularly, to one bit digital data processing devices useful as one bit industrial control units.

2. Brief Description of the Prior Art

Recently, integrated circuit microprocessors have been developed in the semiconductor industry which provide a great deal of computing power on a single semiconductor chip alone or in conjunction with a relatively small number of supporting interface and memory chips. Such machines have typically been "byte-oriented" machines in which data and address information are processed so that all bits of a byte (for example, one byte can consist of 8 bits) are processed in parallel. Such microprocessors are programmable by means of machine instructions, or alternatively, software may be provided, including compilers, in order to permit programming by means of user-oriented programming languages. Either way, relatively skilled programmers are required in order to make optimum use of such microprocessors for many data processing applications. But there are many industrial control applications in which programmable control devices are required which may be readily programmed by mechanically-oriented service support personnel who are relatively untrained in electronics in general, and especially in the area of programming in machine language, assembly language, or user-oriented languages. Although the sophisticated byte-oriented microprocessors are well suited to solving problems involving complex manipulation or sorting of large amounts of data at high speed and at performing complex mathematical and logical computations, when programmed by skilled programmers, they are relatively unsuited for many of the "industrial control" logic operations presently performed by relay system. Relay systems are easily programmable by mechanically oriented persons untrained in the art of computer programming. For example, byte-oriented microprocessors are unsuited to such simple industrial control tasks as controlling the turning on of large numbers of lights or activating simple electro-mechanical switches such as solenoids in power control systems under program control. Many instructions are required in order to implement such a task with presently available byte-oriented microprocessors, and service personnel accustomed to relay type programmable circuits are unable to accomplish such programming tasks without additional training.

SUMMARY OF THE INVENTION

It is an object of the invention to provide a one-bit digital control unit which is readily programmable by persons familiar with or capable of understanding the logic of relay networks.

It is another object of the invention to provide a one-bit digital control unit in which the programming operations correspond to a one-to-one basis with the programming operations associated with a relay network including normally open and normally closed relays.

Briefly described, a one-bit digital control unit for executing any one of a plurality of non-arithmetic instructions includes data conductor means for conducting data to and from the digital control unit and an instruction decoder for receiving and decoding instructions and producing control signals. The digital control unit also includes a logic unit responsive to the instruction decoder for performing non-arithmetic logic operations, such as logical AND, OR, NAND, NOR, Exclusive NOR, operations upon information received from the data conductor means at one input of the logic unit and information present at a second input of the logic unit. The digital control unit also includes a storage element coupled to the output of the logic unit for storing intermediate result information and makes the intermediate result information available at an input of the logic unit.

DESCRIPTION OF THE INVENTION

Figure 1:
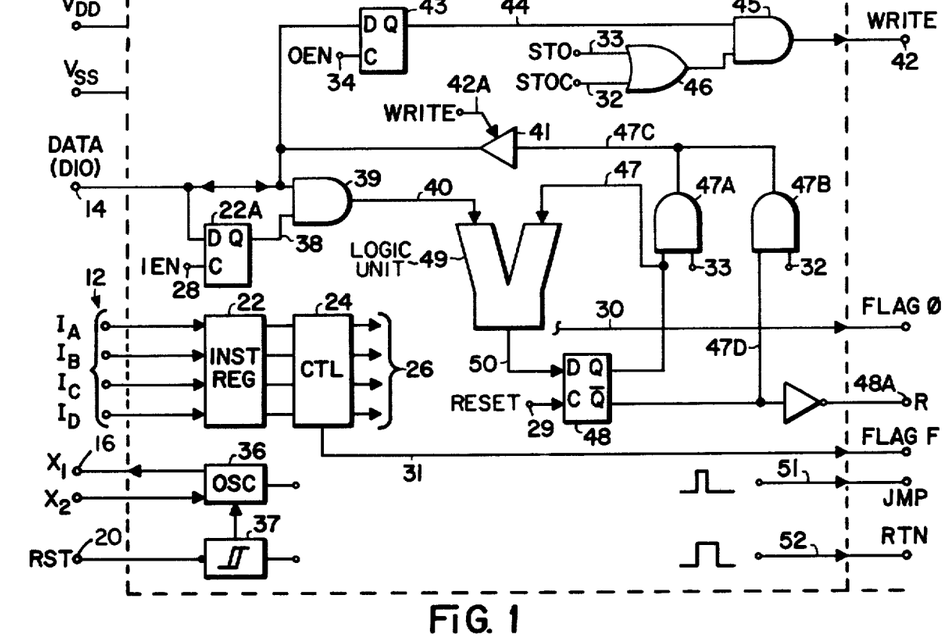
FIG. 1 is a block diagram of a one-bit control unit according to the invention.

Referring to FIG. 1, control unit 10 transmits and receives data over bidirectional data conductor 14, designated DIO. An input enable latch 22A, which may be a clocked D flip-flop, has its D input connected to data conductor 14 and its output 38 connected to one input of AND gate 39. Data conductor 14 is connected to the other input of AND gate 39, and the output 40 of AND gate 39 is connected to one input of non-arithmetic logic unit 49. In a particular implementation, of course, AND gate 39 could be replaced by a NAND gate by taking into consideration the inverted logic output of the NAND gate. In the claims, the term "AND-type gate" is utilized to refer to either an AND gate or a NAND gate, and a similar convention is adopted for the term "OR-type gate," which is used to refer to either an OR gate or a NOR gate. The clock input C of input enable latch 22A is connected to control conductor 28 which has an input enable signal IEN applied thereto. Control conductor 28 is one of the group of output conductors 26 of control logic unit 24, and corresponds to the signal obtained when the IEN (input enable) instruction is decoded. Instruction register 22 has its four inputs generally designated by 12 and by the letters $I_A$, $I_B$, $I_C$, and $I_D$ which in combination designate a four bit instruction code or op code.

One preferred embodiment of the control unit of FIG. 1 is shown in FIGS. 2a-2f. For this preferred embodiment, instruction register 22 latches the four bit instruction code into itself upon a falling edge of the clock signal X1 on conductor 16. Clock signal on X1 is generated by internal oscillator 36, which presents internal clock signals to the circuitry of industrial control unit 10 and also provides an external signal on conductor 16 to provide synchronization with circuitry external to control unit 10, as explained later.

The outputs of instruction register 22 are connected to the inputs of control logic unit 24, which consists of logic circuitry which generates various timing signals and control signals on conductors generally designated by 26 needed to effect overall operation from the circuitry in FIG. 1 in response to each of the 16 instructions which control unit 10 is capable of executing, described subsequently. The signals IEN (input enable) on conductor 28, OEN (output enable) on conductor 34, JMP (jump) on conductor 51, RTN (return) on conductor 52, STO (store) on conductor 33, and STOC (store complement) on conductor 32 are all signals which are generated by control unit 24 in response to decoding of corresponding instructions by instruction register 22. Other control signals generated by control logic 24 appear in FIGS. 2a-2f.

Hysteresis circuit 37 has an input conductor 20 to which a restart input may be applied in order to initialize oscillator 36 and various other circuits in control unit 10 including providing a reset to result register 48 on conductor 29. Non-arithmetic logic unit 49 has a second input 47 and an output 50. Logic unit 49 performs logic operations on the logic signals appearing at first input 40 and second input 47 and produces the logical result on conductor 50 which is connected to the D input of result register 48, which has its clock input connected to conductor 29, which is coupled to control logic 24. The Q output 47 of result register 48, which may be a D type flip-flop, is connected to input 47 of logic unit 49 and to an input of AND gate 47A. Another input of AND gate 47A is connected to STO conductor 33. The output 47C of AND gate 47A is connected to an input of write gate 41. The complementary (Q̄) output 47D of result register 48 is coupled by means of an inverter to conductor 48A, which makes the result available as an external output. Q̄ output 47D is also connected to an input of AND gate 47B, which has it other input connected to STOC conductor 32. The output of AND gate 47B is connected to conductor 47C. AND gates 47A and 47B cooperate with signals on conductors 33 and 32 to enter either the contents of result register 48 or the complement thereof into the input 47C of write gate 41. Conductors 30 and 31, which are also coupled to outputs of control logic 24, generate signals called FLAG $\phi$ and FLAG F in response to execution of the two "no op," or "no operation," instructions described subsequently.

Write gate 41 feeds back either the Q or Q̄ output of result register 48 to the data conductor 14, conditioned on the write signal (on conductor 42A) which is derived from write gates 45, and 46. Thus, it is seen that the result of the logic operation of logic unit 49 can be externally produced on either conductor 48A or on data conductor 14 if a store (STO) or store complement (STOC) instruction is executed and a write signal is present. Output enabled latch 43 has its D input connected to data conductor 14 and its clock input connected to OEN conductor 34. Its output is connected to one input of AND-type gate 45, the other input of which is connected to the output of OR-type gate 46. STO conductor 33 and STOC conductor 32 are connected to the two inputs of OR gate 46. The output of AND gate 45 is connected to write conductor 42 thereby providing an external write signal in response to execution of an STO or STOC instruction when a logic "1" level is presented on line 44.

Figure 2A:
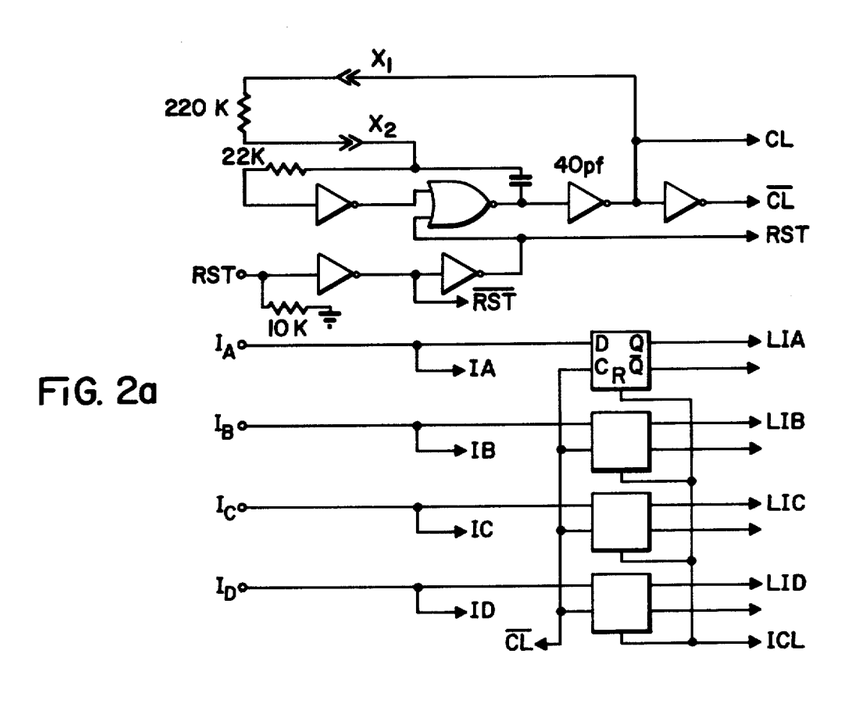
FIGS. 2a-2f in combination constitute a complete logic diagram of the embodiment of the invention shown in FIG. 1.
Figure 2B:
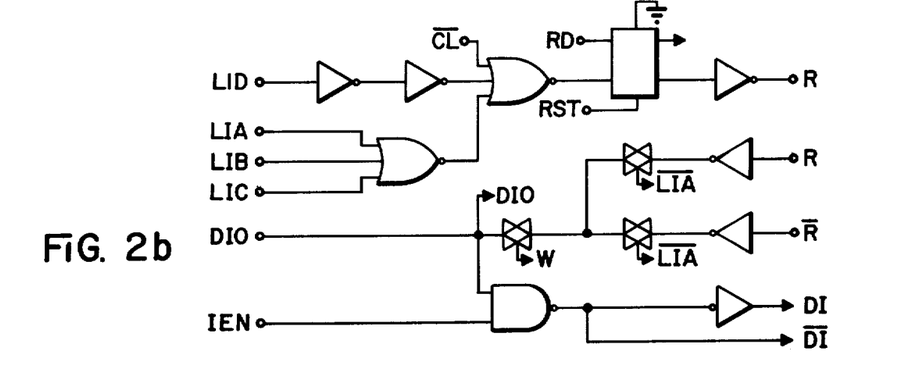
Figure 2C:
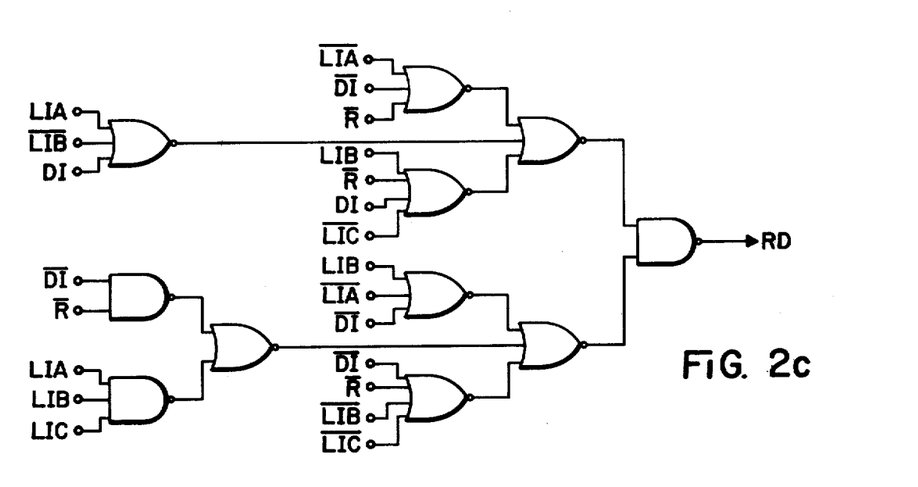
Figure 2D:
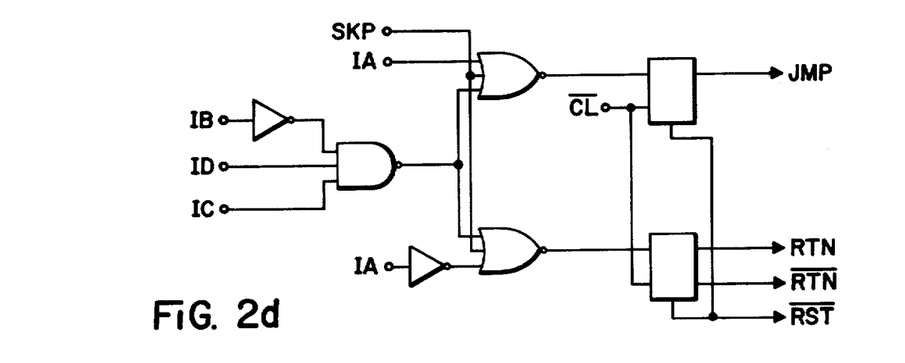
Figure 2E:
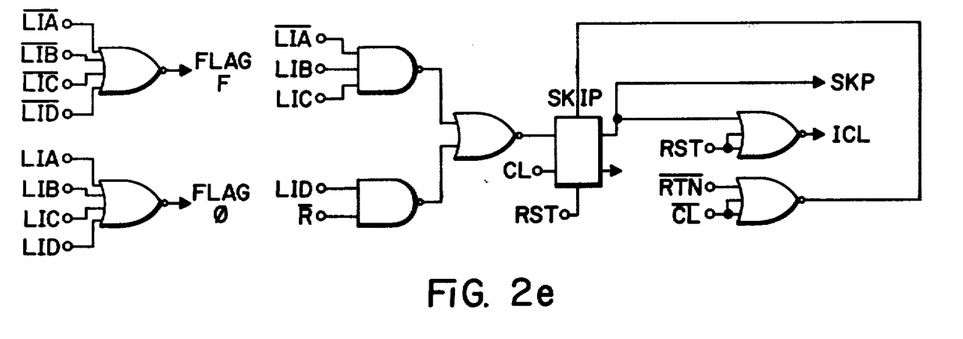
Figure 2F:
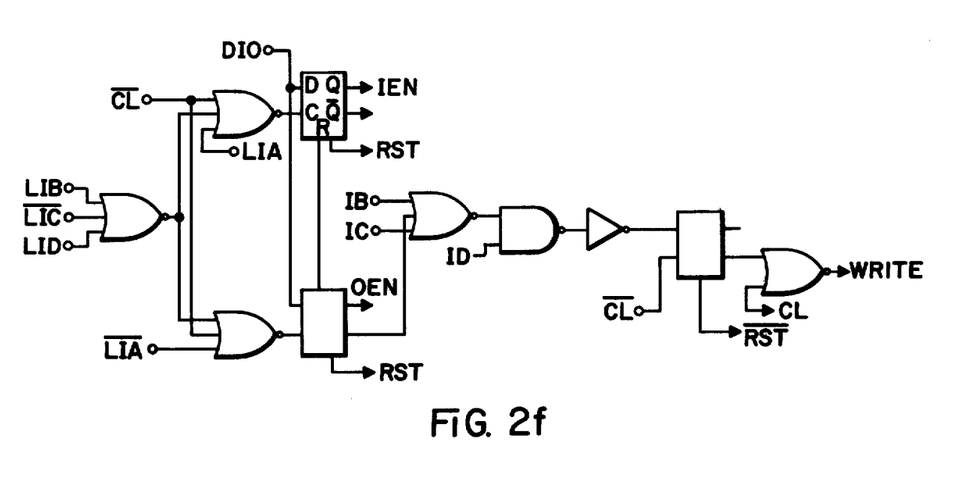

Instruction register 22, oscillator 36, and hysteresis circuit 37 of FIG. 1 are show in more detail in FIG. 2a. Control logic 24 is partly shown in FIG. 2c, partly in FIG. 2e and partly in FIG. 2f. The logic unit 49 and the result register 48 are shown in FIGS. 2b and 2c. Input enable latch 22A and associated circuitry are shown in FIG. 2f. A more precise implementation of the write circuitry is also shown in FIG. 2f. The portion of control logic 24 which generates the JMP signal and the RTN signal is shown in FIG. 2d. The portion of control circuitry 24 which generates the FLAG $\phi$ and FLAG F signals is shown in FIG. 2e. One skilled in the art would have no difficulty at all in producing a working version of control unit 10 from the information in FIGS. 2a-2f, which are in fact representative of an operable experimental breadboard implementation of control unit 10.

The following table is a list of the 16 instructions which the control logic and instruction decoding circuitry 24 is capable of executing.

| | ICU INSTRUCTIONS | |
|---|---|---|
| 0 | NOP | R←R and FLAG 0 = 1 |
| 1 | LDA | R←D |
| 2 | LDAC | R←D̄ |
| 3 | AND | R←R . D |
| 4 | ANDC | R←R . D̄ |
| 5 | OR | R←R+D |
| 6 | ORC | R←R+D̄ |
| 7 | XNOR | R←1 if R = D |
| 8 | STO | D←R and W = 1 |
| 9 | STOC | D←R̄ and W = 1 |
| A | IEN | IEN←D |
| B | OEN | OEN←D |
| C | JMP | JMP 1 |
| D | RTN | RTN 1 |
| E | SKZ | Skip Next if R = 0 |
| F | NOP | R←R and FLAG F = 1 |

The computing power of the industrial control unit is largely based on instructions 1-7. Instructions 1-7 can be utilized to program the ICU (industrial control unit — the term "industrial" is used because the control unit of FIG. 1 is aimed largely at the industrial control market) system in FIG. 3 in the same manner and using the same steps as a conventional relay system performing the same function. Instructions 8 and 9 may be utilized to program the control unit to write information into external I/O (input/output) circuitry or memory circuitry. The "no op" instructions $\phi$ and F can be utilized to generate the FLAG $\phi$ and FLAG F signals which can be utilized by the programmer to perform various tasks in the system. An example would be to provide a timing signal for an oscilloscope or a plotter. Another purpose for the no op instructions is for the case when electrically programmable ROMs are utilized to store the instruction program. An instruction can be readily deleted by simply substituting one of the no op instructions for it. The instruction decoder will interpret the all "0"'s or all "1"'s code as an unprogrammed location. Provision for both the LDA and LDAC signals provide the capability of readily accommodating both positive and negative logic. Instructions C, D, and E are utilized to effect operation of subroutines and to effect operation of an industrial control unit in a system including other processors.

Figure 3:
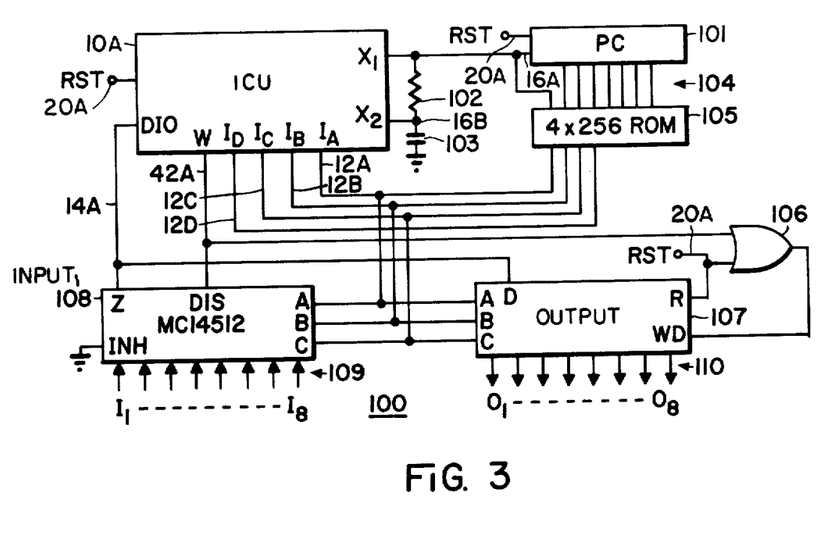
FIG. 3 is a block diagram of a system which utilizes the one-bit control unit of FIG. 1 according to the invention.

FIG. 3 depicts a minimum operable system 100 utilizing the industrial control unit of FIG. 1. This system 100 could readily be expanded to perform the same function as expensive industrial controllers presently implemented utilizing relay ladder networks, and at a far lower cost and far greater speed of operation than such relay systems. One-bit control unit 10A could be the same as the control unit 10 of FIG. 1. Program counter (PC) 101 is a conventional resettable counter. Such counters were widely utilized and need not be detailed herein. The X1 output of control unit 10A is utilized as a clock to program counter 101. The outputs 104 of program counter 101 are coupled directly to the address inputs of a ROM, which could be electrically programmable, and which is arranged as for bits by 256 words. The least significant bit is connected to X1 conductor 16A which also triggers program counter 101. Bit lines 12A, 12B, 12C, and 12D are connected to the instruction code inputs $I_A$, $I_B$, $I_C$, and $I_D$ of control unit 10A. The operation is such that on the rising edges of the clock signal X1 the 4 bit lines produce an instruction code which is latched into the instruction register and is subsequently decoded to execute the particular instruction. Three of the bit lines from read only memory 105 are also connected to the address inputs of addressable output latches 107 and addressable input latches 108. RST is connected to control unit 10A, program counter 101, OR gate 106, and to output latch 107 by conductor 20A. Resistor 102 is in series with capacitor 103 between conductor 16A and ground. Node 16B formed by resistor 102 and capacitor 103 is connected to $X_2$. Addressable 4×256 bit ROMs are widely available throughout the industry and need not be detailed. Addressable latches such as 107 and 108 are also readily implementable by those skilled in the art and are available as Motorola's standard parts MC14512 presently available to the public, and the MC14099 and MC14599, which will soon be available publicly. The data input and data output of addressable latch circuits 107 and 108 respectively are both connected to bidirectional data conductor 14A which is connected to the data input-output terminal of control unit 10 A. The write output 42A of control unit 10A is connected to the disable input of (DIS) of addressable latch 108 and is coupled by means of OR gate 106 to a write data input (WD) of addressable output latch circuit 107. Addressable latch circuit 107 includes eight output latches each having outputs generally designated by 110. Addressable latch 108 includes 8 input latches having input conductors generally designated by 109. Input/output circuitry could readily be implemented on a single integrated circuit chip which would combine latches 107 and 108 into a single part of bidirectional data input/output conductors. The number of bits could be extended from 8 to 16, thereby making use of all four bit line outputs of ROM 105.

Of course, ROM 105 could be expanded to any desired size and any desired number of bits. Only four of the bits, of course, would be utilized to provide the address code during the first portion of each machine cycle, but during a second portion of each machine cycle an address of any desired length could be utilized to input/output circuitry of any desired number of bits.

The operation of the input/output circuitry is such that the input/output line of the addressed input/output latch is coupled to data conductor 14A and all unaddressed input or output latches remain isolated from data conductor 14A. Thus, the control unit 10A in combination with the program counter 101 and a predetermined instruction program in ROM 105 can be utilized to provide any desired sequence of control output signals (for a write operation), or input signals (for a read operation) which may be utilized to, for example, control an industrial machine, manufacturing sequence, etc.

Figure 4:
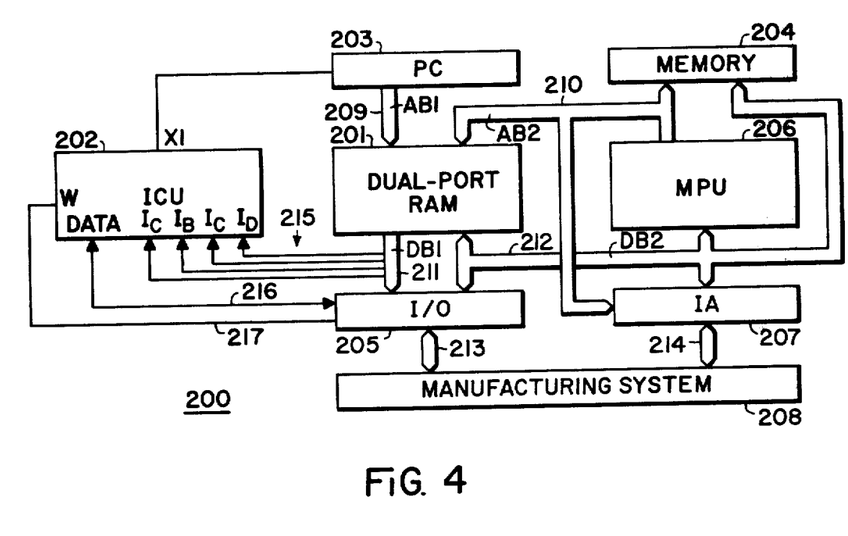
FIG. 4 is a block diagram of another system embodying the control unit of FIG. 1.

FIG. 4 illustrates another application of an industrial control unit such as is shown in FIG. 1. Control unit 202 could be the same as control unit 10 in FIG. 1, and program counter 203 could be essentially the same as is shown in FIG. 3, and I/O circuitry 205 could be the same as shown in FIG. 3 as 107 and 108. A manufacturing system which has a lot of apparatus such as electro-mechanical handling devices, precision furnaces, mixing processes, etc. is designated generally by 208. A plurality of inputs and outputs coupling the manufacturing system to I/O circuitry 205 is generally indicated by 213. Additionally, FIG. 4 discloses a dual-port random access memory 201, a memory 204, a microprocessor 206, and interface adaptor circuitry 207. In system 200, conductors 216 and 217 couple signals between control unit 202 and I/O 205. Memory 204 can include both read only memory and random access memory devices which are widely known and utilized in the industry and need not be described in detail. Microprocessors are also widely known in the industry. For example, the Motorola MC6800, the Fairchild F8, or the Intel 8080 are exemplary. A complete schematic of the Motorola MC6800 is described in U.S. Pat. No. 3,962,682 assigned to the present assignee. Interface adaptor circuitry 207 can include Motorola's MC6820 peripheral interface adaptor disclosed in detail in U.S. Pat. No. 3,979,730 issued to Thomas H. Bennett et al. A suitable random access memory would be the MCM6810 and a suitable read only memory would be the Motorola MCM6830 for inclusion in memory block 204. The peripheral data bus 214 interfaces with adaptors in block 207. A dual port RAM is described in detail suitable to enable one of ordinary skill in the art to implement block 201 in the copending patent application "Dual Port Random Access Memory Storage Cell" by John R. Reinert, Ser. No. 745,023 filed on Nov. 26, 1976 and assigned to the present assignee.

A dual port random access memory provides independent accessing means for accessing each storage cell so that, for example, a particular storage location can be independently read at the same time or different times by two different processors. Either processor can write information into a particular location independently of the other. Consequently, a dual port RAM has two address buses and two data buses associated therewith. In FIG. 4 the first address bus associated with dual port RAM 201 is 209, designated AB1, which is connected to program counter 203. A program which controls control unit 202 is stored in dual port RAM 201, and the addresses of the program instruction to be executed by control unit 202 ae generated by the program counter 203, which is incremented by means of the clock signal X1 generated by control unit 202. The first data bus DB1 associated with the dual port RAM 201 is designated by 211 and conducts the four bit instruction code on conductors 215 during the first portion of each machine cycle and then conducts addresses to select one of the input/output conductors 213 coupling I/O addressable latches 205 to manufacturing system 208 during the latter portion of each machine cycle.

According to the invention, the microprocessor system 200 including 206, 204, and 207 can access the same locations of dual port RAM 201 that controller unit 202 can. Accordingly, the second address bus associated with dual port RAM 201 is AB2, designated 210, and the second data bus associated with dual port RAM 201 is DB2, designated 212. DB2 is coupled to interface adaptor circuitry 207, memory 204, and microprocessor 206 in the fashion described in detail in allowed U.S. Pat. No. 4,004,283 assigned to the present assignee. Thus, the system shown in FIG. 4 could operate so that various aspects of operation of a manufacturing system 208 could be controlled by control unit 202 in accordance with instructions in dual port RAM 201. Other aspects of the operation of manufacturing system 208 which require precision and complex computations can be handled by the system including microprocessor 206, memory 204, and interface adaptor circuitry 207, and modifications to the program being executed by control unit 202 could be made by the second microprocessor system as a result of computations made by the second system. Further, the second microprocessor system may be programmed so as to generate additional instructions to be executed by control unit 202 or to replace instructions initially in the program or subprogram being executed by control unit 202.

It is also possible for control unit 202 to generate the interrupt signals by means of the jump (JMP) instruction or the FLAG $\phi$ or FLAG F "no op" instructions, which could also be utilized to interrupt the second microprocessor system and request it to execute a subroutine or perform some operation on the basis of the results of the execution of that subroutine and then return control to the control unit 202.

Figure 5:
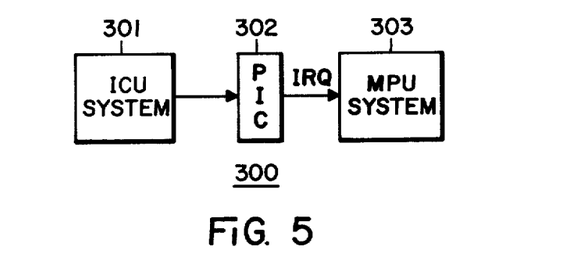
FIG. 5 is a block diagram useful in explaining operation of the control unit according to the invention.

FIG. 5 illustrates the basic concept in which in a system 300 and ICU system 301 generates an interrupt signal on one of its output conductors which acts as an input to a priority interrupt controller 302 which generates an interrupt request signal IRQ which interrupts the microprocessor system 303. A priority interrupt controller can be implemented by one skilled in the art. For example, Motorola's priority interrupt controller, the MC8507, could be utilized.

Figure 7:
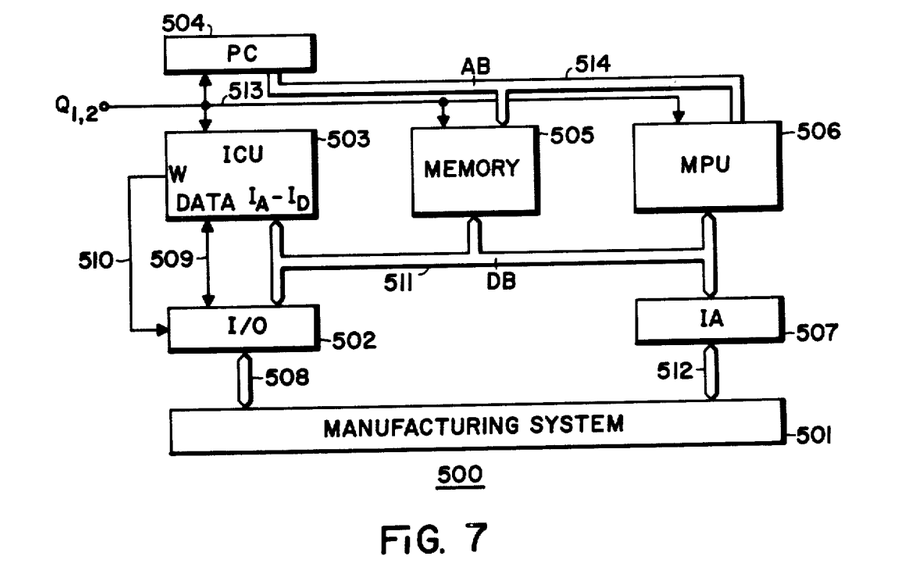
FIG. 7 is a block diagram of another system including a one-bit control unit and a byte-oriented microprocessor according to the invention.

A similar interaction between a one-bit control unit and a byte-oriented microprocessor system can be achieved without utilizing dual port memory, as indicated in FIG. 7. The main difference in the system 500 of FIG. 7 from the system 200 of FIG. 4 is that both the one-bit non-arithmetic control unit and the byte-oriented microprocessor share data bus 511 (or at least some of the conductors thereof) and address bus 514 (again, at least some of the conductors thereof, but not necessarily all of them). If the system 500 of FIG. 7 is utilized, then there needs to be a way of avoiding the problem of having both processors trying to use the same bus at the same time. This objective can be achieved by means of circuitry which, for example, permits control unit 503 to "steal" cycles from the microprocessor 506. Generally, a microprocessor 506 would execute far more instructions than the control unit 503. Control 503 could merely interrupt microprocessor 506 whenever it needs to have control of the address bus or the data bus. It should be noted that control unit 503 does not use data bus 511 as a data bus at all, but rather utilizes it to deliver the instruction code to it and to deliver the addresses of the desired I/O latches in 502. All data transfer associated with control unit 503 takes place via the single bidirectional data conductor 509. Conductor 510 carries the write signal from control unit 503 to I/O 502. Bus 508 carries signals between I/O 502 and manufacturing system 501. Bus 512 carries signals between system 501 and interface adapter (IA) 507. Address bus 514 and data bus 511 carry signals between memory 505 and other units within system 500. Conductor 513 carries input $Q_{1,2}$ to program counter 504, control unit 503, memory 505, and microprocessor 506.

Figure 6:
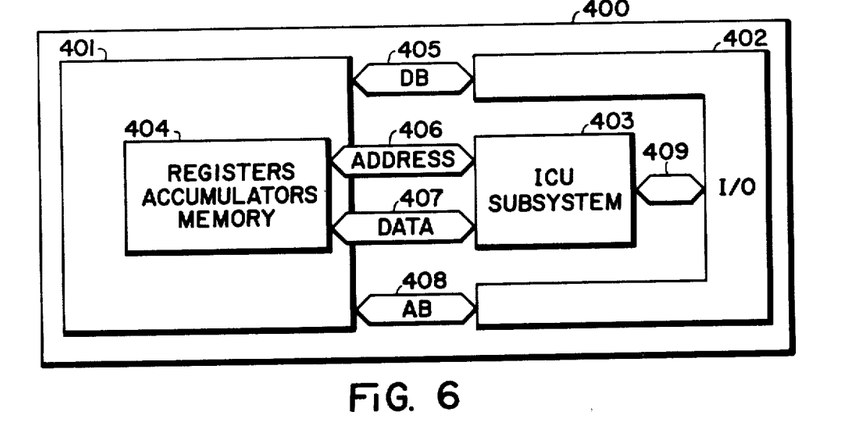
FIG. 6 is a block diagram of an integrated system including a byte-oriented processor and a one-bit control unit according to the invention.

Finally, FIG. 6 discloses an intergrated system wherein a byte-oriented processor 401, which has a multi-bit internal bus structure which conducts data one-byte at a time, and a one-bit control subsystem including components such as those shown in FIGS. 1 and 3 and I/O circuitry 402 which includes circuitry such as the interface adaptors described in U.S. Pat. No. 3,979,730 and other conventional input/output buffer circuitry all in a single intergrated circuit chip 400. Processor 401 includes a memory block 404 which includes register, accumulators, and/or random access memory cells which are addressable by one-bit control unit 403 by means of address bus 406 and which can be written into or read out of by means of data bus 407. The operation, then, is such that the one-bit control unit 403 is capable of performing "bit manipulation" on registers and memory of processor 401. For example, a single bit in the accumulator of processor 401 can be accessed and modified in one machine cycle by control unit 403 in response to information received by control unit 403 from I/O circuitry 402. Similarly, information in one bit of a particular register of processor 401 could be accessed and read by control unit 403 and written into I/O circuitry 402 and provided as an on/off signal on a single conductor emanating from I/O circuitry 402 to an external device, such as a light switch. Bus 409 carries signals between control unit 403 and I/O circuitry 402. Data bus 405 and address bus 408 serve as the interface between processor 401 and I/O circuitry 402.

The I/O circuitry 402 is addressable by either processor 401 or one-bit control unit 403.

What is claimed is:

1. A one-bit digital control unit for executing any one of a plurality of non-arithmetic instructions comprising:
    a single data conductor means for conducting data to and from said digital control unit;
    instruction decode means for receiving and decoding said instructions and producing control signals for effecting execution of said instructions;
    storage means for storing intermediate result information;
    logic means responsive to said instruction decode means, said logic means coupled to said conductor means and to said storage means for performing non-arithmetic logic operations on data received from said data conductor means and from said storage means and causing an output from said logic means which is to be stored in said storage means.

2. The one-bit digital control unit as recited in claim 1 further including oscillator means coupled to said instruction decode means and said logic means for generating a clock signal to effect operation of said instruction decode means and said logic means, said oscillator means also producing an output signal at an output of said one-bit digital control unit for synchronizing other units external from said one-bit digital control unit which may be used to form a system having sad one-bit digital control unit.

3. The one-bit digital control unit as recited in claim 1 further comprising:
    an enable input for conducting an input enable signal;

second storage means responsive to said input enable signal, said second storage means being coupled to said data conductor means for conditionally storing data conducted by said data conductor means;

gating means coupled to said second storage means, to said data conductor means, and to said logic means for conditionally enabling transfer of information from said data conductor means to said logic means when said gating means is conditioned by said second storage means.

4. The one-bit digital control unit as recited in claim 1 further including means coupled to said instruction decode means for producing an output control signal in response to a particular instruction code received by said instruction decode means, the output control signal being to control a function external to said one-bit digital control unit.

5. The one-bit digital control unit as recited in claim 4 wherein said outut control signal represents a jump instruction to a memory unit external from said one-bit digital control unit so that the memory unit can perform a jump operation.

6. The one-bit digital control unit as recited in claim 1 wherein one of said non-arithmetic instructions is a no-operation instruction, wherein no logical operation is performed by said logic means in response to decoding of said no-operation instruction by said decode means.

7. The one-bit digital control unit as recited in claim 1 wherein said non-arithmetic logic operation includes a logical ANDing operation and also a logical inverting operation.

8. The one-bit digital control unit as recited in claim 1 wherein said non-arithmetic logic operations include a logical ORing operation and also a logical Exclusive ORing operation.

9. The one-bit digital control unit as recited in claim 1 wherein said non-arithmetic instructions include load, load complement, AND, AND complement, OR, OR complement, Exclusive NOR, store, and store complement instructions.

10. The one-bit digital control unit as recited in claim 1 further including:
an enable conductor for conducting an output enable signal into said one-bit digital control unit.
output enable storage means responsive to said output enable signal, said output enable storage means being coupled to said data conductor means for conditionally storing data conducted by said data conductor means;
gating means responsive to said output enable storage means, aid gating means being coupled to said instruction decode means for providing a write signal in response to a decoded store instruction provided by said instruction decode means.

11. A one-bit digital control unit for executing a plurality of instructions comprising:
data conductor means for conducting data to and from said digital control unit;
a plurality of instruction input conductors for conducting any one of a plurality of digital codes each representative, respectively, of said instructions to said digital control unit;
instruction decode means responsive to said digital codes, said instruction decode means being coupled to said instruction input conductors for decoding one of said digital codes and producing a decoder output signal corresponding to a decoded one of said instructions;
control means responsive to said decoder output signal for producing a plurality of control signals for effecting execution of said decoded one of said instructions;
logic means having first and second inputs and an output, said logic means being responsive to said control signals, said logic means coupled to said data conductor means for effecting performance of a selected one of the plurality of instructions and for producing an output signal at said output, said plurality of instructions including at least and AND-type function, but not including any arithmetic-type functions;
storage outputs means responsive to said control means and coupled to said output of said logic means and to said second input, said storage output means being for storing information representative of said output of said logic means;
means responsive to said storage output means for selectively coupling an output of said storage output means to said first input of said logic means.

12. A one-bit digital control unit for executing a plurality of instructions comprising:
a single data terminal means for conducting data to and from said digital control unit;
a plurality of instruction input conductors;
instruction decode means responsive to digital code signals, said instruction decode means being coupled to said plurality of instruction input conductors for decoding an instruction code and producing a decoder output signal corresponding to a decoded instruction;
control means responsive to said decoder output signal for producing a plurality of control signals for effecting execution of said decoded instruction;
logic means having first and second inputs and an output, said logic means being responsive to said control signals, said logic means being coupled to said data terminal means for effecting performance of one of a plurality of logical functions on data signals on said first and second inputs and for producing a corresponding result signal at said output, said plurality of logical functions including an AND-type function and an invert-type function, but not including any arithmetic-type function;
result storage means responsive to said control means and coupled to said output and to said second input for storing information representative of said result signal;
means responsive to said result storage means for selectively coupling an output of said result storage means to said first input.

* * * * *